Figures 1, 2, 3, 4:
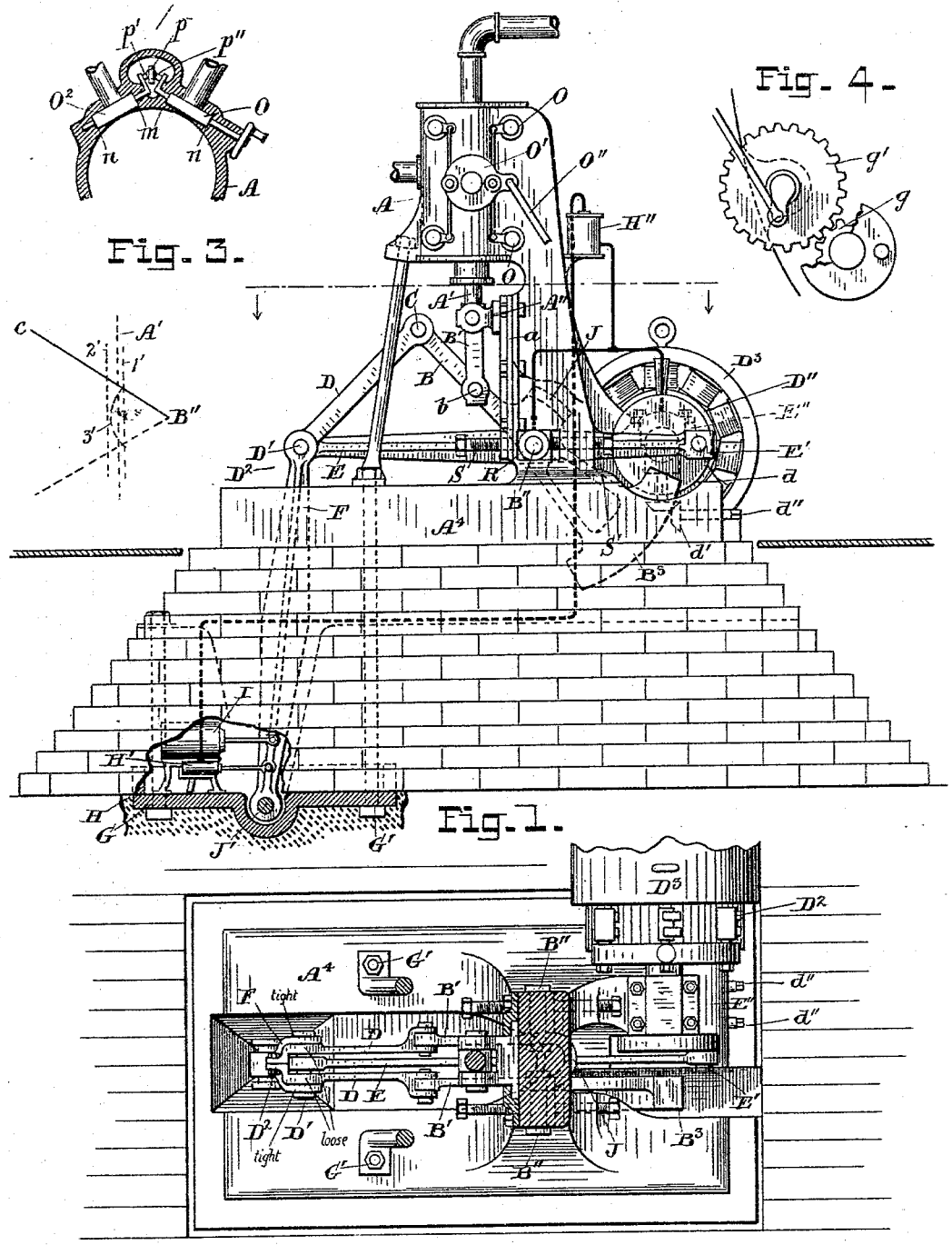

(No Model.) 2 Sheets—Sheet 1.

E. A. SPERRY.
STEAM ENGINE.

No. 551,480. Patented Dec. 17, 1895.

Witnesses.
Louis P. Hall
M. Nielson

Inventor.
Elmer A. Sperry (No Model.)  2 Sheets—Sheet 2.
E. A. SPERRY.
STEAM ENGINE.
No. 551,480. Patented Dec. 17, 1895.
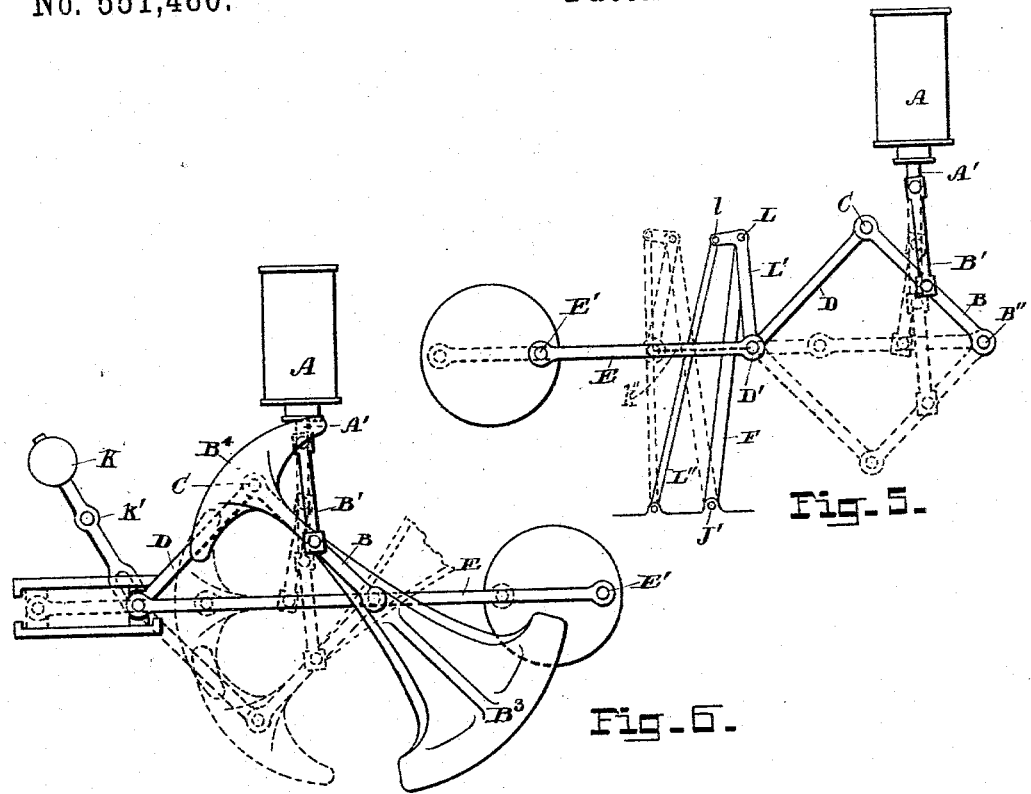
Fig. 5.
Fig. 6.
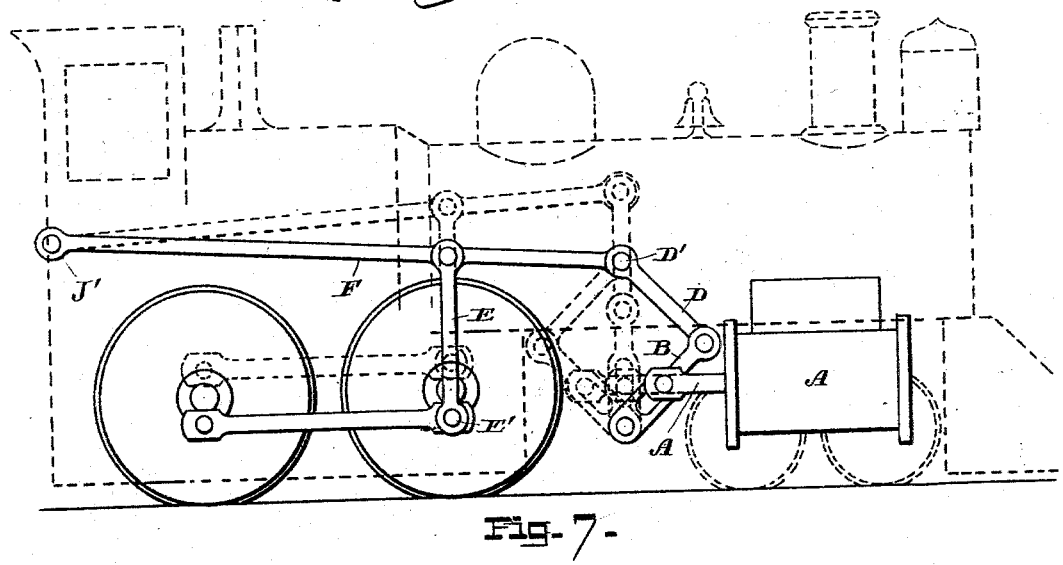
Fig. 7.
Witnesses.
Louis P. Abell
M. Nielson
Inventor.
Elmer A. Sperry

UNITED STATES PATENT OFFICE.

ELMER A. SPERRY, OF CLEVELAND, OHIO.

STEAM-ENGINE.

SPECIFICATION forming part of Letters Patent No. 551,480, dated December 17, 1895.

Application filed October 15, 1894. Serial No. 525,916. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Steam-Engines, of which the following is a specification.

My invention relates to power motors or engines of the class known as "reciprocating" engines. For many well-known purposes a high rotative speed is desirable in an engine, an example being the direct driving of electric generators. This, however, is incompatible in many ways with the highest economies, requiring excessive piston-speeds and the use of valves and valve-gearing, which are undesirable from points of economy and durability.

The object of the present invention is to so connect the rotating part with the reciprocating portion of the engine that high speeds of the former will be attained with comparatively low speeds of the latter. For instance, a comparatively slow-moving piston working with a cylinder fitted with valve-gear commonly known as the "Corliss" type, can, by my arrangement, without change of stroke or other relations employed with the highest economies, be made to give double the rotative speed as compared with engines coupled in the ordinary manner. This allows an electric generator, fan, centrifugal pump, rolling-mill or many other machines, which it is desirable to directly attach to or mount upon the engine-shaft and which require comparatively high rotative speeds, to be built of only half the size, weight, and cost, producing in this way increased result or output, and a compact, desirable, combined machine at very greatly-reduced cost.

High speeds have been attempted by short-stroke and large cylinders, but the arrangement is found wasteful, owing to the excessive clearance, journal strain, crank, and other friction necessarily present in this type of engine. Excessive speeds have also been attempted by increasing the piston-speed; but long years of practice have determined a point beyond which the piston-speed should not be increased. Gearing and belting are for many purposes entirely inadmissible. Link and crank motions have been resorted to, but in no instance have the combinations, proportions of parts and travel, compensating devices for utilizing idle portions of the stroke, equalizing the strains in different portions of the revolution, and the other directly-related functions, &c., described herein been developed or brought out, nor have the important objects fully attained in the present device been before accomplished.

The said invention further consists in the disposition of certain masses and weights or added weight to the moving parts for the purposes hereinafter fully pointed out; and it also consists in the arrangement of certain counterweights for the reciprocating parts whereby the engine is freed from vibration in different planes. It also includes a parallel link-support consisting in part of a swinging arm.

The invention also includes means connected with the crank-shaft of an engine whereby a condenser or other pump-piston and other parts may be given two reciprocations of the piston, whereby the said pump may be made smaller or single acting, or both, as hereinafter pointed out.

My present invention further consists in various details of construction for accomplishing the objects above set forth, and others which are described in the following specification, pointed out in the claims forming a part hereof, and also illustrated in the accompanying drawings and diagrams, in which—

Figure 1 is an elevation of an engine raised upon its foundation. Fig. 2 is a plan view of same, partially in section. Figs. 3 and 4 are details of construction. Figs. 5 and 6 are diagrams of the lever movements of the engine. Fig. 7 shows an arrangement as applied to a locomotive.

Like letters and numerals of reference indicate the same parts throughout.

The cylinder or other source of reciprocatory motion A may be simple, as in the upright engine shown in Fig. 1, or compound, following any of the well-known methods. The power delivered to the reciprocating element or piston A' is delivered to the swinging lever B through the link or short pitman B', attached to a point *b* intermediate in the lever between its ends or between its fulcrum B″ and one of its ends C. The cross-head A″ may be guided in any proper manner by the slide, as indicated at a, or any of the well-known devices for parallel movement may be resorted to to preserve the alignment of the lower end of the piston A′ against the slight side strains due to the small angular movement of the pitman B′. The lower end of this pitman travels in a circular path, (indicated by 3′ in the diagram to the left,) and the dotted line A′ indicates the line of movement of the upper pivot of the pitman B′ with reference to the circular travel of its lower end. It will be seen by the lines 1′ and 2′, which are parallels through the extreme positions of the point b, that it is nearer the line 1′ on the side of the fulcrum B″.

The mass or lever B swinging about the fulcrum B″ may be simple, as is indicated in Figs. 5, 6 and 7, or it may be provided with an added mass or counterweight B³. This and other added masses in connection with the oscillating parts will be discussed more fully hereinafter. It will be seen from the figures that the lever B forms one of a pair of articulating levers or links oscillating about their remote ends as centers. The link D, Fig. 1, extends from the point C to the pin D′, being mounted loosely thereon. This pin, which is preferably tight in either the pitman E or beam or swinging arm F, serves to transmit the motion from the link D to the pitman E and thence to the crank E′ secured to the crank-shaft journaled in the pillow-block E″. The pillow-block may be of peculiar construction and so made that the housings and crank-shaft may be adjusted vertically within such pillow-block. This may be accomplished by two screws shown in dotted lines at d, and each furnished with a bevel-gear d′ and a squared portion on the horizontal shaft shown at d² d². This last-named device is especially advantageous when the engine is used to operate a direct-driven dynamo-armature D″ or other device, which must be kept very accurate as to center or alignment with reference to the fields D³.

In case of the armature or other like mounted part where the vertical adjustment of the crank-shaft is desirable, this adjustment is entirely compatible with low-cylinder clearances for the reason that the motion is derived through the links, as shown, and the position of the crank-shaft when upon the forward dead-center is the only factor which determines the position of the piston or other reciprocating parts at the ends of their strokes.

It will be noticed that the pillow-block E″ and the housing for the lever-fulcrum B″ are in the same upright projection from the bed-plate A⁴ of the engine. This projection may stop at this point or rise on beyond, forming guides for the cross-head and support for the cylinder or cylinders.

The lubrication of the various joints and journals is effected in a novel manner as follows: The lowest projection downward of the engine being the lower end of the swinging arm or system F, the gudgeon J′ on which this arm swings is secured to a "sole-plate" G, which in turn is bolted to the base-frame A⁴ of the engine by bolts G′ G′, which pass down through the foundation from the base-plate. The sole-plate is cast with a rim or wall H, rising upward from its face, forming in this manner an oil-cavity which serves to catch the waste oil from the various joints of the engine and connected machinery, and thus automatically keeps the lower journal of the arm, which stands in the oil, well lubricated. A small pump H′ has its moving part attached to the swinging arm or system and is piped to discharge into the reservoir or filter H″, from which the oil is led to the various joints requiring lubrication. This filter may be set high enough on the engine to reach the valves. The swinging arm or system may be also employed to operate the condenser of the engine, which is illustrated at I, and both oil pump and condenser and its pump or stationary part thereof may be anchored or secured to the same sole-plate, which may thus serve to secure all portions, including the engine-foundation, more solidly in place. The connection from the condenser to the engine or its exhaust is omitted for the sake of clearness. This exhaust is preferably led down through the upright frame of the engine or one of its parts, thus connecting to the condenser without exterior piping.

The articulating links, vibrating about their remote ends as centers, which connect the power source with the pitman, may be single, as shown on the second sheet of the drawings, or double, as indicated on the first sheet. When double, the counterweight B³ may preferably be attached to only one of the members, or may be attached to the other member also, and in this case might be shorter. An arch J may be sprung over near the gudgeons B″, connecting the two members of the lever B. A short pitman B′ is also divided and connects the cross-head to both members of the lever. The links D are also divided and constitute a member upon each side, connecting at one end to the two members of the lever B and at the other end to the pin which connects them to the pitman E. These links D, as in the case of the lever B, are united at a point D². The pin D′ at this joint, whether guided by the swinging arm F, the parallel motion shown in Fig. 5 or a slide shown in Fig. 6, is always loose in the link D and tight either in the swinging arm, guide or the pitman, preferably the longer member, or the one with the least lateral vibration. The counterweight B³ is preferably equal to the weight of the arm B upon the other side of the gudgeon B″, together with the various attached vibrating members. Another counterweight K (see Fig. 6) is employed to counterpoise the machine against horizontal vibration. This counterweight is omitted from Fig.

1 for the sake of clearness. The mass K, by means of pivot K' vibrating in the opposite direction to the pitman E, is enabled to balance same. The parallel motion shown in Fig. 5 for guiding the free end of the link D consists of an upright swinging arm F, which passes up above the rectilinear line of travel K'' or on the opposite side thereof from the gudgeon J' to a point L, where is hung by its angle a bell-crank lever L', the long arm of which reaches down to the pin D' and the other arm of which is secured to a stationary object by link L'' pivoted to the said short arm at point l. The dotted lines to the left indicate its position when the links B and D are on the center line of their oscillation. It will be seen that the links L'' and F are never parallel to each other, inasmuch as their bases are farther apart than their tops. The angle which they form determines the relative angular swing of the arm F and lever L'.

As has been above stated, any intermittent source of power may be employed, such as the cylinder A, which may be fitted with the moving valves O O, &c. These valves may be of any well-known type and receive their motion by any of the well-known methods—as, for instance, an adaptation of the Joy valve-gear—or they may receive their motion through the plate O' and the rod O'' in the usual manner of operating Corliss valves, the rod O'' receiving its motion from the crank-shaft by any speed-reducing gear—as, for instance, that indicated by pinion $g$ and gear $g'$ attached to the base and omitted in Fig. 1, but shown in detail in Fig. 4. A counter-shaft $i$ may also be employed to work other parts of the engine—for instance, the governor, &c.—omitted for the sake of clearness.

In engines of this class the question of clearance is one of great moment, and many means have been resorted to to accomplish the end. Fig. 3 shows the construction I have adopted for accomplishing this purpose, which consists in allowing the opening from the cylinder to occupy a small angular space on the bore of the cylinder indicated between $m$ and $n$, so that the straight face of the valve O will at no point recede very far from the bore, thus leaving large waste spaces. For the requisite area of opening, however, more than one valve is needed, and two are used at an angle to each other and may or may not be coupled, as by a universal joint of any of the well-known forms. The one indicated in the drawings consists of a link $p$ connecting two ball-pins $p'$ $p''$ extending from cranks connected with either valve. This universal joint enables the valves to be coupled for simultaneous movement.

Beside the counterweight $B^3$ the lever B is loaded with the counterweight $B^4$ in Fig. 6. In Fig. 7 the device is shown as being adapted to a locomotive giving increased capacity in speed of rotation of drivers without the limitation of excessive piston travel, as has heretofore been the case. In this arrangement the swinging arm F is shown to receive the entire energy from the oscillating links B and D, and the pitman E being secured to the swinging arm F at a point removed from the pin D'. This figure is given more in the line of alternate application than to illustrate the exact arrangement or details which will be found best in practice, which will vary with circumstances.

The use and operation will be readily understood from the foregoing. The reciprocation of the piston A' is transformed into rotary motion of the crank E' through the oscillation of the articulating-links, the axis of the crank-shaft lying practically in the projection of the middle line of the oscillation of the links. One of the links B being anchored at the fulcrum or gudgeon B'', the free end of the other link D vibrates to and from this gudgeon and hence turns the crank by this vibration, which occurs twice for every single oscillation of the links. The said free end being connected to the crank by the pitman E the crank-shaft is given two revolutions for each double stroke of the piston, and at the same time the length of the stroke of the pitman and piston may be held on an equality or may be made to vary in any desired ratio to each other. When these ratios are equal, the strength of the parts—for instance, the crank-shaft, pillow-block, crank-pin, pitman, &c.—need not be materially altered from the best practice in the ordinary type of engine. This, it will readily be understood, would not be the case if, for instance, the piston was attached to the oscillating links at their articulating-point C. In this case the strokes of the pitman for anything like the best distribution of strains would have to be far less than the length of the stroke of the piston, and would therefore have to be made very much heavier for an engine of a given piston-speed, and furthermore the limitation which by far is the greatest in present engines would in no wise be overcome, but would on the other hand be aggravated. I wish to point out therefore that the attachment of the piston to a point on the lever B intermediate between the fulcrum and the articulating-point C or any method with the arrangement shown whereby the stroke-lengths of the pitman and piston may if required be rendered equal and allowed to vary from this point either way, forms one of the essential parts of the present invention.

To illustrate my next point—namely, the masses and counterweights attached to and forming a part of the oscillating or reciprocating elements or both—I will take a case of a four-hundred horse-power engine making one hundred double strokes of the piston and two hundred revolutions of the crank-shaft. The articulating-point C between the lever and the link will be found to attain a velocity of about fifty-two feet per second crossing the center line of its oscillation—that is, in half a stroke it has attained approximately this velocity. It has been found that the weight of the vibrating masses should be such that at this central point they will have absorbed in their acceleration a considerable percentage of the energy delivered from the source of power. This should for most instances exceed thirty to fifty per cent. of such power. With high velocities light parts will fulfill these requirements. It may be with advantage increased considerably beyond this point, but should not be decreased very much below it, although farther experience may lead to a wider variation for special purposes. In the case cited one ton at this point may be made to absorb 165.6 horse-power seconds. The energy stored up in the moving masses at this point is delivered by them to the pitman and crank-shaft in the last half of the stroke. In this region the pressures due to early cut-off, expansion of steam or other causes would otherwise be materially lessened, the advantage of this arrangement being a very even distribution of the pressures on the crank-pin through both halves of each stroke. The increase in weight of the oscillating mass furthermore tends to neutralize the lunge or tendency to pound and to give a more uniform movement while passing the center of oscillation, at which point the strains are reversed. Both these points have been found essential and necessary, not only to smooth running but for economical construction.

Another marked advantage of the use of the vibrating parts as power-storage and for supplying the deficiencies in rotating effort which would otherwise be present is apparent when compared with the fly-wheel. In the perfect engine the fly-wheel should have no change of motion. Its only possible reservoir of power is through change in velocity, and therefore its use varies inversely as the engine approaches perfection, whereas with the system existing in the present invention we have vibrating masses in which it is desired to store power, which masses are constantly and naturally changing their velocity, and the storage is therefore made possible by utilizing these changes in velocity, which in a large measure already exist.

The energies derived from the counterweight $B^3$, which is a continuation of one member of the double-arm lever, are transferred more or less to the other member through the arched connection J. The adjustment of the gudgeon-housing R by the screws S S' is for the purpose of bringing the gudgeon in the proper relation to the crank-shaft—for instance, when the links B and D are forming a straight line and the crank is on its dead-center. The vertical adjustment of the crank-shaft and the pillow-block is effected by movement of the lower screws $d$, as described, and the loosening or tightening of the cap-bolts. This enables the crank-shaft to retain an exact relation to the driven parts mounted thereon, and at the same time retain all the alignment necessary with the moving parts of the engine.

The alignment of the reciprocating part with reference to the swinging arm B is preferably back of the center of the oscillation of the lower end of the pitman B' or pin $b$, so that in the extreme positions (upper and lower)—those positions where the greatest efforts are received from the piston A'—it will be more nearly in line with the direction of force than in its middle position, where the leverages over the load are also more favorable for delivery of the smaller energies to the crank-shaft.

By referring to Fig. 5 it will be seen that in the first quarter of the downstroke of the piston or first quarter of the revolution of the crank-shaft the pin D' will have moved over through half or practically half of the stroke. In this position both the swinging arm F and the arm L' of the bell-crank will be vertical and the increasing height of the point L by the swinging over of the arm F will be neutralized by the lowering of the point D' by the swing or angular movement of the arm L' from the position shown in the full lines to the middle position referred to. The links L" and F may be of the same length, and it will be seen that the arm L $l$ is shorter than the base-line between the gudgeon J' and that of the link L". This makes the line K' an approximation to a rectilinear or straight line and produces a very satisfactory and simple "parallel motion" for the support and guidance of the pin D'.

I do not care to limit myself to the exact construction or proportion shown in the accompanying drawings. They simply serve to illustrate one of the many forms in which the invention may be embodied, and although it is designed to use all the above features in connection with each other, yet it is obvious that some may be used without the others, and the invention extends to such use.

Having thus briefly stated the construction and operation of my invention, what I claim as new, and desire to secure by Letters Patent, is—

1. In an engine, a reciprocating piston, a cylinder therefor, a crank shaft, a crank and pitman, mechanism lying between the crank and piston for causing two strokes of the pitman for a single stroke of the piston, in combination with means located upon or forming a part of such mechanism for storing power during the first of the strokes of said pitman for use during the second.

2. In an engine, a crank, a crank shaft, a pillow block, a link and lever oscillating about their remote ends as centers and articulate with each other, a pitman connecting the end of the link to the crank, a source of power, a connection from such source of power to the lever, in combination with the gudgeon for the lever pivotally connected to the pillow block at a point substantially in line with the pitman when the crank is on its dead center and between the link and the said pillow block.

3. In a motor, a crank, a crank shaft, a pillow block, a source of power, a divided lever oscillating about a fulcrum, connection between the lever and said source, an intermediate link articulating with the said lever at a point thereon removed from the fulcrum, a pitman lying in the space between the two lever parts connecting the said link with the crank, in combination with a gudgeon upon each half of the divided lever forming such fulcrum, the gudgeon being pivotally connected to the pillow block at a point substantially in line with the pitman when the crank is on the dead center and between the said intermediate link and the said pillow block; and a connecting arch or portion joining said lever parts near the said gudgeon.

4. In an engine, a link and a lever oscillating about their remote ends as centers and articulate with each other, a source of power and connections from the said source to the lever, the lever being pivotally connected to a pillow block, a pitman connecting the link to the crank shaft, the gudgeons forming said pivot operating in a housing and located one on each side and adjacent to the pitman at a point between its ends when the said pitman is on either dead center, in combination with the aforesaid housing for the gudgeons connected to the pillow block, substantially for the purpose specified.

5. In a motor, a crank, a crank shaft, a pillow block, a source of power, a divided lever oscillating about a fulcrum, connection between the lever and the said source, an intermediate link articulating with the said lever at a point removed from the fulcrum, a pitman lying in the space between the two members of the said divided lever connecting the said link and the crank, a gudgeon upon each half of the divided lever forming such fulcrum, the gudgeon being pivotally connected to the pillow block at a point between the said intermediate link and the said pillow block, in combination with a weight attached to one member only of the divided link or lever on the opposite side of the gudgeon.

6. In a motor, a crank, a source of power, a divided lever oscillating about a fulcrum, connection between the lever and the said source, two intermediate links each articulating by one of its ends with one of the members of the said lever, said two links being united at their other ends, in combination with the pitman connecting such links to the crank at a point between said point of union and their other ends.

7. In an engine, a crank, a crank shaft, a pillow block, a link and a lever oscillating about their remote ends as centers and articulate with each other, a source of power and a connection therefrom to the lever, one end of the lever being connected to the pillow block and one end of the link connected to the crank, a swinging support connected suitably at or near the last named end for guiding same, and a journal at the opposite end of such support attached directly to the "sole plate" of the engine, and a masonry foundation between the sole plate and the engine.

8. In an engine, a crank shaft, a dynamo or electric generator mounted thereon, a pillow block for the said crank shaft, and means for vertical adjustment of the said shaft within the pillow block.

9. In an engine, a crank, a crank shaft and pillow block, a lever and a link oscillating about their remote ends as centers, and articulate with each other, the link being connected to the crank and the lever pivotally connected to the pillow block, a source of power and connections therefrom to the lever, moving valves forming a part of such power source, a connection for actuating the valves, and a speed-reducing gear between the crank shaft and such connection.

10. In an engine, a crank, a crank shaft and pillow block, a lever and a link oscillating about their remote ends as centers, and articulate with each other, a source of power and connection therefrom to the lever, a pitman connecting one end of the link to the crank, one end of the lever being pivotally connected to the pillow block through a gudgeon or gudgeons connected to the said lever, in combination with means for adjustment of position of such gudgeons with reference to the pillow block.

11. In an engine, a crank, a crank shaft and pillow block, a lever and a link oscillating about their remote ends as centers, and articulate with each other, a source of power and connection therefrom to the lever, a pitman connecting one end of the link to the crank and one end of the lever being pivotally connected to the pillow block through a gudgeon or gudgeons connected to the said lever, an engine frame consisting of a foundation plate, and an upright projection forming combined housings for both the said pillow block and gudgeons.

12. In an engine, a cylinder, valves for the cylinder, openings from the cylinder to the valves lying practically in the same transverse plane but at different angles from the center, separate valves in the openings coupled for simultaneous movement, and means for actuating one valve only from the exterior of the cylinder.

13. In an engine, a cylinder, valves for the cylinder, openings from the cylinder to the valves lying practically in the same transverse plane but at different angles from the center, rotary valves in each opening with their axes at an angle to each other, and mechanism for simultaneous movement of the valves.

14. In an engine, a cylinder, valves for the cylinder, openings from the cylinder to the valves lying practically in the same transverse plane but at different angles from the center, rotary valves in each opening with their axes at an angle to each other, mechanism for simultaneous movement of the valves, and means extending to the exterior of the cylinder for operating one of the valves.

15. In an engine, a reciprocating piston, a pitman for the engine, a fulcrumed lever connected to the pitman, in combination with a counterweight for the said pitman connected thereto and vibrating substantially at right angles to the said reciprocations of the said piston, said counterweight being attached to the lever, the said fulcrum being located between the said counterweight and the point of connection of the lever with the pitman, substantially for the purpose specified.

16. In an engine, a piston, a pitman, a lever for the piston, in combination with a counterweight for the said piston vibrating at substantially right angles to the pitman, the said counterweight being attached to or forming a part of the said lever, and a counterweight for the pitman vibrating at right angles to the piston counterweight, substantially for the purpose specified.

17. In an engine, a crank shaft and pillow block, a link and a lever oscillating about their remote ends as centers and articulate with each other, a source of power and connection therefrom to the lever, one end of the lever being connected with the pillow block and one end of the link connected to the crank, a guide for the last named end consisting of a swinging arm pivoted to a stationary part and extending therefrom toward the link substantially at right angles to the movement of the said end to a point beyond or to the other side of the said end, in combination with a shorter vibrating arm pivoted to the said swinging arm at or near its free extremity, and extending from such extremity back in a direction toward the said pivot of the said arm and there connected to the said end of the links, a second swinging arm connecting with the vibrating arm, substantially as and for the purpose specified.

18. In an engine, a crank shaft and pillow block, a link and a lever oscillating about their remote ends as centers and articulate with each other, a source of power and connection therefrom to the lever, one end of the lever being connected with the pillow block and one end of the link connected to the crank, a guide for the last named end consisting of a swinging arm pivoted to a stationary part and extending therefrom toward the link, substantially at right angles to the movement of the said end to a point beyond or to the other side of the said end, in combination with a shorter vibrating arm pivoted to the said arm at or near its free extremity and extending from such extremity back in a direction toward the said pivot of the said arm and there connected to the said last named end of the link, and means for compelling the said shorter arm to vibrate equally each side of the said swinging arm, substantially for the purpose specified.

19. In an engine, a crank, a crank shaft, a pillow block, a link and a lever oscillating about their remote ends as centers and articulate with each other, a source of power and a connection therefrom to the lever, one end of the lever being connected to the pillow block and one end of the link connected to the crank, and a "parallel motion" consisting of the swinging arms F and L″ and bell crank L′ connected at or near the last named end and extending practically at right angles to the line of movement of the said last named end.

20. In an engine having vibrating moving mechanism, a vertical swinging arm constituting a part thereof and extending downward to a journal at its lower end, said journal connected with an extended plate forming a sole plate of the engine, a raised collar upon such plate constituting oil-retaining walls, a masonry foundation for the engine, a bolt connecting the plate with the engine passing through the said foundation, and an oil-circulating pump connecting with the cavity within such walls; in combination with a driving connection between a moving part of the said mechanism and the said pump.

21. In an engine having vibrating moving mechanism, a vertical swinging arm constituting a part thereof and extending downward to a journal at its lower end, said journal connected with an extended plate forming a sole plate of the engine, a raised collar upon such plate constituting oil-retaining walls, a masonry foundation for the engine, a bolt connecting the plate with the engine passing through the said foundation, and an oil-circulating pump connecting with the cavity within such walls; in combination with a driving connection between a moving part of the said mechanism and the said pump consisting of the said vertical swinging arm.

22. In an engine, a reciprocating piston, a cylinder therefor, a crank shaft, a crank and pitman, mechanism lying between the crank and piston for causing two strokes of the pitman for a single stroke of the piston, means located upon or forming a part of such mechanism for storing power during the first of the strokes of said pitman for use during the second, in combination with an electrical generator, the rotating part of which is mounted upon the said crank shaft.

23. In an engine, a crank, a crank shaft, a pillow block, a link and a lever oscillating about their remote ends as centers and articulating with each other, a pitman connecting the end of the link to the crank, a source of power, a connection from such source to the lever, a gudgeon for the lever pivotally connected to the pillow block at a point substantially in line with the pitman when the crank is on its dead center, in combination with an electrical generator, the rotating part of which is mounted upon the said crank shaft.

24. In an engine, a crank, a crank shaft, a pillow block, a link and a lever oscillating about their remote ends as centers, and articulate with each other, a reciprocating source of power, and a connection therefrom to the lever, one end of the lever being connected to the pillow block and one end of the link connected to the crank, in combination with an extra load or weight connected to or forming a part of the oscillating part, the location of the weight upon the parts being such that it in whole or part vibrates in the same direction with the piston for the purpose of power storage between the piston and the crank shaft.

25. In an engine, a reciprocating piston, a fulcrumed lever, power connection located between the said piston and a crank shaft, a connection from the piston to the said lever, an extension of the lever beyond such connection, in combination with a weight the whole or part of which is connected to or forms a part of such extension, having thereby a travel in the same direction and greater than the piston for purposes of power storage between the said piston and crank shaft, substantially as set forth.

ELMER A. SPERRY.

Witnesses:
M. NIELSON,
LOUIS R. ABELL.